May 12, 1959 R. S. WILLIAMSON 2,886,271
AUTOMOBILE TOP LOAD CARRYING DEVICE
Filed June 10, 1955 2 Sheets-Sheet 2

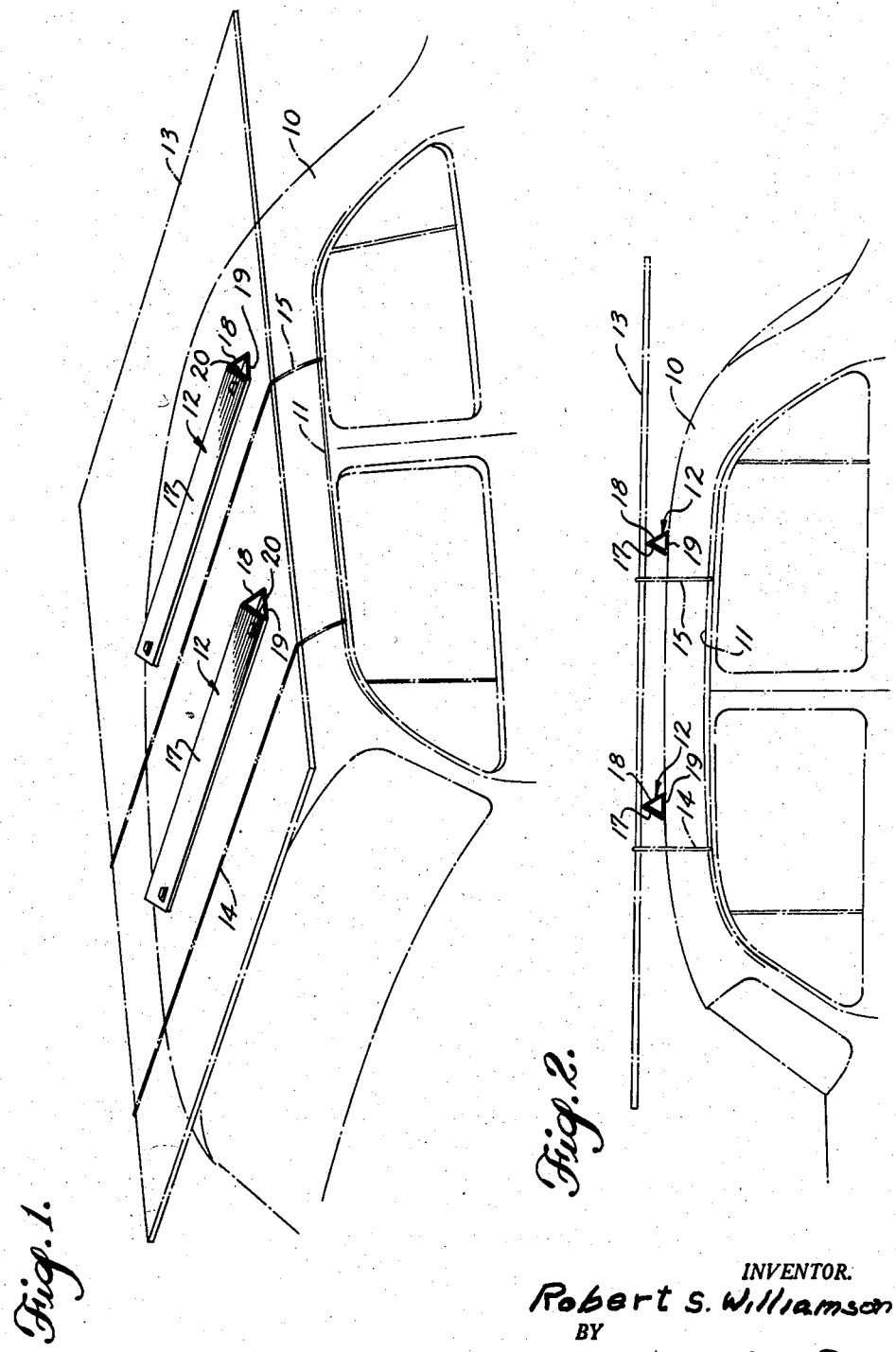

INVENTOR.
Robert S. Williamson
BY
Clinton L. Mathis
ATTORNEY

United States Patent Office 2,886,271
Patented May 12, 1959

2,886,271

AUTOMOBILE TOP LOAD CARRYING DEVICE

Robert S. Williamson, Teaneck, N.J., assignor to Plywood Research Foundation, Tacoma, Wash., a corporation of Washington Application June 10, 1955, Serial No. 514,413

1 Claim. (Cl. 248—119)

This invention relates to a car top carrier. More particularly this invention relates to an inexpensive foldable corrugated sheet, which may be shipped in a flat condition and assembled on the job, to provide supports on the top of an automobile and which will support relatively bulky pieces of merchandise, such as pieces of plywood (generally 4' by 8'), pieces of plasterboard, insulating board, pieces of lumber and the like. Thus the carrier members of this invention are particularly useful in the delivery of building materials but not limited thereto.

There has developed, in recent years, a very substantially increased trade in "Do It Yourself" building in connection with houses and the customers generally desire small orders of lumber products delivered toward a weekend and with very short notice in ordering. Present delivery systems are inadequate to provide such services on such short notice or are too expensive for handling relatively light loads. Thus a very substantial demand has grown for car top carriers which are inexpensive, which can be readily installed, which will permit safe carriage of the load on the top of the automobile, which can be readily disassembled, and which will not damage the car top.

It is an object of this invention to provide a car top carrier in a flat sheet made of corrugated paper and having score lines thereon so that the device can be readily folded into a support having a triangular section and cut out tongue and slot locking means to hold the triangular shape during travel of the automobile and with the load supported thereon.

It is a particular object of this invention to provide a simple construction of very substantial strength and which has a locking means which is entirely safe and which will not open when the device is in use in carrying a load on the top of the car.

Other objects and advantages of this invention will become apparent as the description of the same proceeds and the invention will be best understood from the consideration of the accompanying detailed description, taken in connection with the accompanying drawings forming a part of the specification, with the understanding, however, that the invention is not to be limited to the exact details of construction shown and described since obvious modifications will occur to a person skilled in the art.

Figure 1 is a perspective view of devices of this invention and illustrative of their use in connection with a car top, a single sheet of plywood as the load, and two strands of twine employed to secure the said devices, load, and car top in relatively fixed position;

Fig. 2 is a view of the parts shown in Fig. 1 and taken substantially lengthwise of the top of the automobile;

Figure 3:
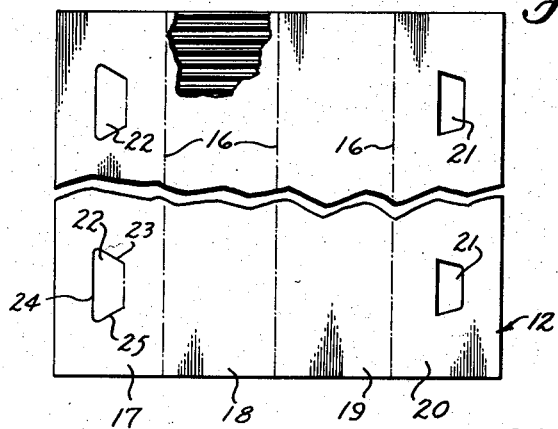
Fig. 3 is a fragmentary view with portions broken away indicating the flat sheet of corrugated board which has been properly scored and with cut-outs shown to form slots and with a tongue cut along three edges and scored on the fourth edge.

Referring now to Figs. 1 and 2 of the drawings, an automobile top portion is illustrated and generally numbered 10. Other parts of the automobile top which may be utilized in securing devices of my invention to an automobile top are the door openings or openings secured by lowering windows. Also the water gutters 11, which are now generally standard equipment with most automobiles, and which run longitudinally of the automobile on the marginal portions of the top of the car, may be utilized. While I have illustrated my invention as applied to a four door sedan, devices of my invention may be applied to other types of automobiles, such as two door sedans and coupes. For maximum utility of devices of my invention, I provide two load supporting devices which extend crosswise of an automobile and are longitudinally spaced approximately three feet.

In applying the load supporting members, generally numbered 12, the same are preferably located crosswise on the top of an automobile for the reasons expressed and for the further reason that the load may be relatively large flat members such as plywood panels of standard dimension 4' by 8' or the load may be pieces of lumber or may be a combination thereof.

After the said load supporting members 12 are placed as indicated in Figs. 1 and 2 of the drawings, then a load indicated by a plywood panel 13 is placed on said supports. Then preferably both front doors of the car are opened and a piece of twine is passed crossways on the inside of the car and thence over the respective gutters 11 on the opposite sides of the cars and over the load. The ends of the twine may be positioned and tied at any desired location. With the type and size of twine now commonly available around lumber yards, a double twine is preferably employed. Thereafter the front doors can be opened or closed as desired and the twine across inside the car will not interfere with the normal movements of the driver or the passengers and normal operation of the car can be obtained. I may or may not have doors at the rear of the car and only windows. In case of a four door sedan the twine at the rear is preferably rigged in the manner indicated for the front of the automobile. However, if I have a two door sedan or a coupe, then both rear windows are slightly lowered and a twine is passed crosswise inside of the car and through the space above the windows and then across the load and is otherwise disposed in the same manner as indicated with the piece of twine 14 at the front of the car. Thus the piece of twine 15 for the rear may pass through the door opening above the door or may pass above windows as the case may be.

As will best be seen in Figs. 1 and 2, the load supporting members 12 bend only slightly when a load is applied and tied in place. This provides sufficient contact of the carriers 12 and the car top 10 and at the same time causes the twines 14 and 15 to pass directly from the load to the gutters 11 and clear of the top of the car thus preventing damage to pain on the car top. There is, apparently, no relative movement of twine to the top of the door openings or to the top of window openings, as I have found that padding material has not been required to protect the car from the twine.

Now referring to the details of construction of the members 12, as is illustrated in Figs. 3 to 8 of the drawings, the blank is preferably cut from corrugated paper board and to illustrate the direction of travel of the corrugations, portions of one surface ply have been removed in the drawings.

In Fig. 3 of the drawings, the center portion of the blank is broken away for obvious purposes. Generally I find it advisable, for the greatest economy of cardboard and to provide a support having the desired strength, to employ a blank panel approximately 36 inches long and approximately 13¼ inches wide. Score lines 16 are provided so that the sections 17, 18, 19 and 20 may be formed by bending the blank along the score lines 16 in a manner to be described. Two trapezoid shaped cutouts or openings 21 are provided in the panel 20 and two mating tongues 22 are provided in the panel or section 17. Obviously tongues 22 could be located in sections 20 and the openings 21 could be located in the sections 17 but I prefer the arrangement as shown.

The tongues 22 have cut edge portions 23, 24, and 25 and the remaining edge of the tongue is not cut and is preferably not scored. Also the tongues 22 are of a greater dimension in width than that of the recesses 21 for the purposes which will be hereinafter described. Also it will be noted that the corrugations run crosswise of the panel blank shown in Fig. 3 of the drawings so that said corrugations will run in an up and down direction in the panels 18 and 20 when the device is in use and thus providing for the greatest strength in said direction of said panels 18 and 20 as respects the amount of corrugated board employed.

In folding the device, and assuming that the board lies in the position shown in Fig. 3 of the drawings, the panel or section 20 will be bent upwardly approximately 120° as respects the panel or section 19 along the score line 16 between said sections. Next the panel section 18 will be bent upwardly along the score line 16 between it and section 19 and again we will have an angle of approximately 120° between the sections 18 and 19. Next the section 17 will be bent downwardly and over the then upper end of section 20 and the bend will be along the score line 16 between the sections 17 and 18. At such location the section 17 overlies the section 20 and the tongues 22 and openings 21 are alined.

As the tongues 22 are of a greater dimension in width than the openings 21, the tongues 22 can be wedged or warped into openings 21 and tend to be retained by the walls forming openings 21.

It is to be noted that the section 17 carries no part of the load and that the tongues 22 and openings 21 carry only the load of securing the section 17 in place in superposed relation on section 20. The entire load is carried by the base section 19 and the side wall sections 18 and 20. The section 17 may be termed a flap or retaining member to maintain the two side sections 18 and 20 and base section 19 in their proper relation to carrying the load. Thus by the construction just described, I have provided for minimum mass of corrugated board and maximum strength. Also it will be obvious that the section 17 need not be of full width to carry out its function. However, sections 17 and 18 are visible to the public and thus function as a carrier for advertising media and hence section 17 should be only slightly less in height than the panel 20.

From the foregoing it is obvious that the load supporting device comprises a base section 19; a first side wall section 20 connected with said base section 19 along one marginal portion and said section 20 extends upwardly and inwardly. Next it will be obvious that I have provided a second side wall section 18 which is connected with the base section 19 and extends upwardly and inwardly and contacts the section 20 to form an apex. Next I have provided a third side wall section 17 which is connected with said second wall section 18 and passes over the top of section 20 and lies directly over said wall section 20.

Next it will be obvious that in the combinations above mentioned I have provided interlocking tongue and recess means which are carried in paired relation by the sections 20 and 17.

Figure 6:
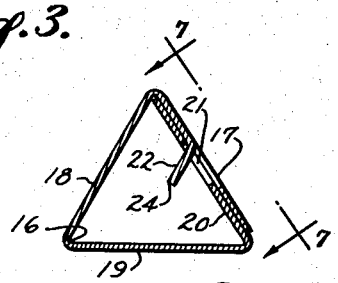
Fig. 6 is a sectional view taken substantially on broken line 6—6 of Fig. 5.
Figure 4:
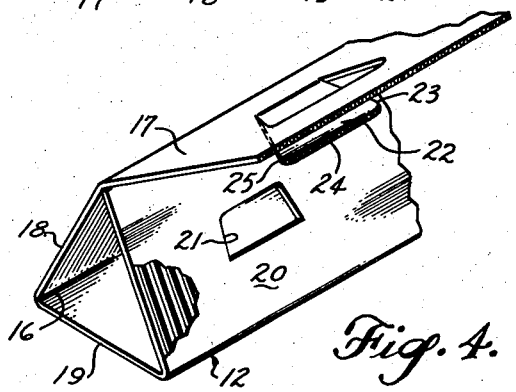
Fig. 4 is a fragmentary perspective view and with the device partially assembled.
Figure 7:
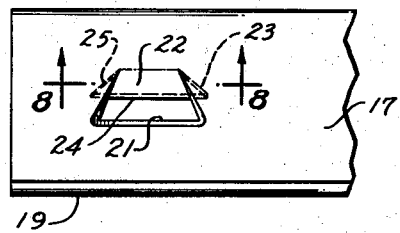
Fig. 7 is a fragmentary elevational view looking substantially in the direction of broken line 7—7 of Fig. 6.
Figure 5:
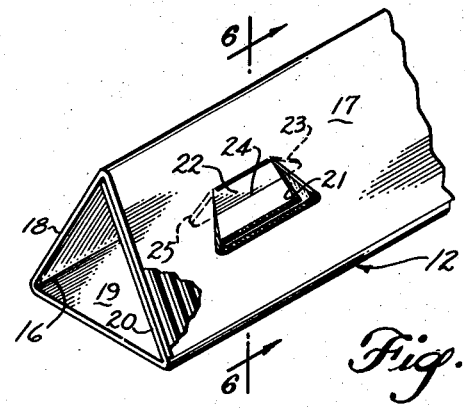
Fig. 5 is a view similar to Fig. 4 and with the device completely assembled.
Figure 8:
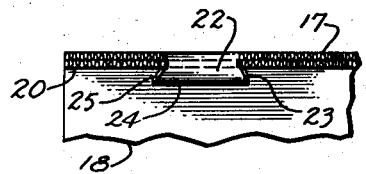
Fig. 8 is a fragmentary sectional view taken substantially on broken line 8—8 of Fig. 7.

When the skids of this invention are under load, the top edge of each wall section 20 is closely engaged in the apex between the sections 17 and 18. These are the conditions represented by Figs. 5 and 6. However, when not under load, there will be a slight spacing of said top edge from said apex due to the springiness of the corrugated paper. Fig. 6 shows the inside upper edge of the tongue 22 spaced from the adjacent upper edge of the recess 21 to permit the necessary but limited sliding movement, thus allowing the skid to accommodate itself to the load.

Obviously changes may be made in the dimensions, arrangements, and parts of my invention without departing from the principle thereof, the above setting forth only a preferred form of embodiment of my invention.

I claim:

A load supporting device formed from a continuous sheet comprising a rectangular base section; a first side wall section connected with said base section along one longer marginal portion and extending upwardly and inwardly; a second side wall section connected with said base section along the opposite longer marginal portion of said base section and extending upwardly and inwardly and contacting said first side wall section to form an apex; a third side wall section connected with said second wall section, and passing over the top of and lying directly over said first wall section, said first and second side wall sections functioning as thrust members and the base section functioning as tension means between the wall sections; and a pair of interlocking tongue and recess means for securing the first and third side wall sections to one another, the two tongues of said means being carried in paired relationship by one of said first and third side wall sections and positioned intermediate the length thereof, and the recess means being similarly carried by the other of said last named two side wall sections, said tongue and recess means being substantially of trapezoidal shape, with the tongue being wider than the matching recess of a side wall and with the base of the tongue being parallel to the base section, said interlocking tongue and recess means permitting relative sliding movement between the first and third sections without unlocking the interlocking tongue and recess means and maintaining the first and third sections parallel.

References Cited in the file of this patent

UNITED STATES PATENTS

| 2,255,492 | Peters | Sept. 9, 1941 |
| 2,288,739 | Peters | July 7, 1942 |
| 2,716,532 | Wysong et al. | Aug. 30, 1955 |

FOREIGN PATENTS

| 398,044 | Great Britain | Sept. 7, 1933 |